(12) United States Patent
Silva et al.

(10) Patent No.: US 12,539,884 B2
(45) Date of Patent: Feb. 3, 2026

(54) IMPLEMENTING SLOWDOWN MANOEUVRES IN AUTONOMOUS VEHICLES

(71) Applicant: Five AI Limited, Cambridge (GB)

(72) Inventors: Alexandre Silva, Edinburgh (GB); Alejandro Bordallo, Edinburgh (GB); Steffen Jaekel, Edinburgh (GB)

(73) Assignee: Five AI Limited, Cambridge (GB)

( * ) Notice: Subject to any disclaimer, the term of this patent is extended or adjusted under 35 U.S.C. 154(b) by 70 days.

(21) Appl. No.: 18/281,646

(22) PCT Filed: Mar. 11, 2022

(86) PCT No.: PCT/EP2022/056405
§ 371 (c)(1),
(2) Date: Sep. 12, 2023

(87) PCT Pub. No.: WO2022/189661
PCT Pub. Date: Sep. 15, 2022

(65) Prior Publication Data
US 2024/0300536 A1    Sep. 12, 2024

(30) Foreign Application Priority Data
Mar. 12, 2021  (GB) ..................... 2103435

(51) Int. Cl.
*B60W 60/00*  (2020.01)
*B60W 30/09*  (2012.01)
*B60W 50/00*  (2006.01)

(52) U.S. Cl.
CPC ........ *B60W 60/0016* (2020.02); *B60W 30/09* (2013.01); *B60W 50/00* (2013.01);
(Continued)

(58) Field of Classification Search
CPC .. B60W 60/0016; B60W 30/09; B60W 50/00; B60W 2050/0028;
(Continued)

(56) References Cited

U.S. PATENT DOCUMENTS

| | | | |
|---|---|---|---|
| 2009/0164109 A1 | 6/2009 | Maruyama | |
| 2015/0012204 A1* | 1/2015 | Breuer | B60R 21/0134 701/96 |

(Continued)

FOREIGN PATENT DOCUMENTS

| | | |
|---|---|---|
| EP | 1170652 A1 | 1/2002 |
| GB | 2549320 A | 10/2017 |

OTHER PUBLICATIONS

International Search Report; PCT/EP2022/056405; Date: Jul. 21, 2022; By: Authorized Officer: Granier, Frederic.

*Primary Examiner* — Jason Holloway
(74) *Attorney, Agent, or Firm* — Andrew J. Tibbetts; Samuel S. Stone; Greenberg Traurig, LLP

(57) ABSTRACT

A computer-implemented method of determining control signals for controlling an autonomous vehicle to implement a slowdown manoeuvre, comprising: detecting an obstacle at a distance ahead of the autonomous vehicle; comparing the distance with a threshold value and implementing a slowdown manoeuvre in dependence on the comparison, the slowdown manoeuvre selected from: a first slowdown manoeuvre carried out by a kinematic function, which is a time derivative of acceleration, in which a constraint optimisation has been applied to optimise a cost function of the slowdown manoeuvre subject to a set of hard constraints that require a final acceleration, speed and position to satisfy respective acceleration, speed and position targets, given an initial speed and acceleration of the vehicle, and impose a jerk magnitude upper limit; and a second slowdown manoeuvre implemented in an adaptive cruise control mode (Continued)

which aims to reach a target headway between the autonomous vehicle and the obstacle.

16 Claims, 9 Drawing Sheets

(52) U.S. Cl.
CPC ............... *B60W 2050/0028* (2013.01); *B60W 2520/105* (2013.01); *B60W 2554/802* (2020.02)

(58) Field of Classification Search
CPC ..... B60W 2520/105; B60W 2554/802; B60W 2050/0002; B60W 30/025; B60W 30/14; B60W 30/16; B60W 2050/0054; B60W 2720/103; B60W 2720/106; B60W 2754/30; B60W 30/0956; B60W 60/00
See application file for complete search history.

(56) References Cited

U.S. PATENT DOCUMENTS

| | | | |
|---|---|---|---|
| 2019/0329772 A1* | 10/2019 | Graves | B60W 30/16 |
| 2020/0307589 A1* | 10/2020 | Li | B60W 60/0023 |
| 2020/0331476 A1* | 10/2020 | Chen | G05D 1/0088 |
| 2022/0402491 A1* | 12/2022 | Jaekel | B60W 30/18159 |
| 2023/0339465 A1* | 10/2023 | Althoff | B60W 30/0956 |

* cited by examiner

IMPLEMENTING SLOWDOWN MANOEUVRES IN AUTONOMOUS VEHICLES

CROSS-REFERENCE TO RELATED APPLICATIONS

This application is the U.S. National Stage application, pursuant to 35 U.S.C. § 371, of PCT International Patent Application No. PCT/EP2022/056405, filed Mar. 11, 2022, designating the United States and published in English, which claims priority under 35 U.S.C. §§ 119 and 365 to Great Britain Patent Application No. 2103435.0, filed Mar. 12, 2021. The contents of each of the aforementioned applications are incorporated herein by reference in their entirety.

FIELD OF INVENTION

The present disclosure relates to autonomous vehicle technology, and in particular to the implementation of certain slow down manoeuvres in fully or semi-autonomous vehicles.

TECHNICAL BACKGROUND

An autonomous vehicle (AV), also known as a self-driving vehicle, refers to a vehicle which has a sensor system for monitoring its external environment and a control system that is capable of making and implementing driving decisions automatically. Decisions are made based on sensory input and implemented using an actor system of the AV (e.g. which may comprise drive by wire steering motors, and a throttle and brake control system). This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision capability and therefore still require a degree of oversight from a human driver.

Control systems, such as adaptive cruise control (ACC), provide a system for automatically controlling the speed of an ego vehicle. ACC acts to maintain a headway between the ego vehicle and the vehicle directly in front. More sophisticated autonomous vehicles are being developed with the aim of ultimately achieving full "level 5" autonomy.

SUMMARY

In urban settings, an AV may be required to stop frequently. It may be required to stop at traffic lights, stop or give way signs or roundabout entrances for example. Stopping manoeuvres are also required in non-urban settings. More generally, slow down manoeuvres (reducing speed but not necessarily to zero) are required in many driving contexts. Techniques developed by Five AI and described in our earlier patent application No. 2002365.1 allow a planned speed change manoeuvre to be carried out safely with an emphasis on comfort for the passengers of the vehicle where possible. According to those techniques, a position target is received from a manoeuvre planner for a planned speed change manoeuvre. A constrained optimisation process is carried out in respect of at least one kinematic function selected for carrying out the planned speed change manoeuvre, the kinematic function being a first or higher order derivative of acceleration with respect to time. The constrained optimisation process substantially optimises a cost function defined for the speed change manoeuvre which is subject to a set of hard constraints that:
  i) require a final acceleration, speed and position corresponding to the selected kinematic function to satisfy, respectively, an acceleration target, a speed target and the position target given an initial speed and acceleration of the autonomous vehicle, and;
  ii) impose a jerk magnitude upper limit on the selected kinematic function.

The constrained optimisation process may be applied in respect of the kinematic function by selecting, from a predetermined family of kinematic functions, a selected kinematic function, wherein the kinematic function is selected in the constrained optimisation process. The selected kinematic function may be used to determine a series of control signals for implementing the planned speed change manoeuvre.

Alternatively, the constrained optimisation process may be applied in respect of the kinematic function by computing a kinematic function for carrying out the planned speed change in the constrained optimisation process where the constrained optimisation process is performed in the domain of the kinematic function, with the final acceleration speed and position derived from the kinematic function, given an initial speed and acceleration of the autonomous vehicle in order to apply the hard constraints.

A series of control signals for implementing the planned speed change manoeuvre may be determined based on the constrained optimisation process.

These techniques have been found to be suitable for both emergency and non-emergency slow down manoeuvres. The techniques can be performed with different jerk (and where applicable) acceleration and/or speed limits. The techniques may make use of "comfort" and "slowdown" constraints with different limits.

Using these techniques, a manoeuvre planner may determine a slowdown distance based on "dynamic" inputs pertaining to external acts in the vicinity of an ego vehicle. For example, a maximum stopping distance along a road may be determined in order to bring the ego vehicle to a stop at some appropriate headway behind a stationary forward vehicle, or to match the speed and acceleration of a non-stationary forward vehicle at a suitable headway from it. An example of this in a non-emergency context would be bringing the ego vehicle to a stop in traffic, or when the forward vehicle is stopped at traffic lights or a junction etc. An example of an emergency context is when another vehicle pulls out in front of the ego vehicle, a short distance away from it. In such a situation, the techniques described in the application No. 2002365.1 may have certain limitations. To perform the constraint optimisation process described in our earlier patent application No. 2002365.1, a slowdown distance $p_{target}$ is required for part of the optimisation process. In circumstances where headway between the ego vehicle and the forward vehicle is too small, this distance $p_{target}$ would be a negative value. In that case, the constraint optimisation process cannot perform its computations. In the case where p target is set to 0 or negative numbers, the optimisation process cannot successfully compute control signals.

Aspects of the present invention address scenarios in a way which overcome this limitation.

In a scenario where an unexpected obstacle is detected ahead of the ego vehicle within a short distance, the distance between the ego vehicle and the forward obstacle, or the headway, of the vehicle is suddenly reduced. When this occurs, the ego vehicle may be driving in an ACC mode, planning to maintain a certain headway between itself and the forward vehicle.

Embodiments of the present invention provide a process in which a check is first made if automatic cruise control could still deal with the new scenario. If it can, then automatic cruise control is maintained. If automatic cruise control cannot handle the scenario, then a slowdown manoeuvre is conducted. The slowdown manoeuvre is selected from an optimisation-based slowdown or a controller-based ACC slowdown. In some embodiments, the decision is based on the current headway between the ego vehicle and a forward obstacle, compared with a threshold headway.

According to an aspect of the invention there is provided a computer implemented method of determining a series of control signals for controlling an autonomous vehicle to implement a planned slowdown manoeuvre, the method comprising:
  detecting an obstacle at a distance ahead of the autonomous vehicle;
  comparing the distance with a threshold value and implementing a slowdown manoeuvre in dependence on the comparison, the slowdown manoeuvre selected from:
   a) a first slowdown manoeuvre carried out by a kinematic function which is a first or higher order derivative of acceleration with respect to time, in which a constraint optimisation process has been applied relative to the kinematic function, the constrained optimisation process substantially optimising a cost function defined for the slowdown manoeuvre subject to a set of hard constraints that:
    i. require a final acceleration, speed and position corresponding to the kinematic function to satisfy respectively an acceleration target, a speed target and a position target, given an initial speed and acceleration of the autonomous vehicle, and;
    ii. impose a jerk magnitude upper limit on the kinematic function; and
   b) a second slowdown manoeuvre implemented in an adaptive cruise control mode which aims to reach a target headway between the autonomous vehicle and the obstacle.

In many implementations of an adaptive cruise control mode, there is also an aim to minimise relative speed between the autonomous vehicle and the obstacle.

The slowdown manoeuvre a) is selected in the situation where the distance from the autonomous vehicle to the obstacle exceeds the threshold value, such that it is judged that a safe slowdown manoeuvre may be implemented. In that case, the position target for the planned slowdown manoeuvre may be given as the difference between the threshold value and the distance between the autonomous vehicle and the obstacle (the headway). The threshold value may be set at any appropriate value for the context. For example, in some situations the threshold value may be set at 8 metres. If for example an obstacle was detected at 10 metres from the autonomous vehicle, a position target of 2 metres ahead of the autonomous vehicle would be given to the function for implementing the slowdown manoeuvre.

The slowdown manoeuvre (b) is selected when the distance between the autonomous vehicle and the obstacle is less than the threshold value.

A common scenario when an obstacle is detected ahead of an autonomous vehicle is where a vehicle pulls out in front of the ego vehicle unexpectedly. Another scenario is where an obstacle was occluded in a scene, for example due to poor perception. It may not be necessary in all scenarios to immediately perform an emergency slowdown manoeuvre. In that case, a form of adaptive cruise control can be utilised, which aims to reach and maintain a target headway and minimise relative speed between the ego vehicle and the forward vehicle, the target headway being determined by the following:

$$d_{ACC} = V_{EV} \times T_t + d_S,$$

where $T_t$ denotes a headway time, $d_S$ denotes a static headway and $V_E V$ is a target velocity of the autonomous vehicle. Note that the static headway $d_s$ acts as a minimum target headway. The headway $d_{ACC}$ depends on the velocity $V_{EV}$ of the ego vehicle. However, when the velocity $V_{EV}=0$, the headway becomes $d_{ACC}=d_s$, the minimum value for target headway. This minimum headway $d_s$ may also be referred to as a threshold headway herein.

The second slowdown manoeuvre is implemented in an adaptive cruise control mode under the imposition of constraints in respect of at least one of acceleration and jerk, wherein the constraints are set at values which exceed values for implementing a motion profile satisfying human comfort constraints. In some embodiments, the applied jerk constraints may be set at $[+10,-10]$ ms$^{-3}$, and the applied acceleration constraints may be set at $[+4,-4]$ ms$^{-2}$. However, other ranges are possible depending on circumstances.

The constraint optimisation process of the first slowdown manoeuvre is applied in respect of the kinematic function by selecting, from a predetermined family of kinematic functions, a selected kinematic function, wherein the kinematic function is selected in the constraint optimisation process, and wherein the selected kinematic function is used to determine the series of control signals for implementing the planned speed change manoeuvre.

The constraint optimisation process can be applied in respect of the kinematic function by computing a kinematic function for carrying out the planned speed change in the constraint optimisation process where the constraint optimisation process is performed in the domain of the kinematic function, with the final acceleration speed and position derived from the kinematic function, given an initial speed and acceleration of the autonomous vehicle in order to apply the hard constraints. In this case, the series of control signals for implementing the planned speed change manoeuvre are determined based on the constraint optimisation process.

According to yet another aspect of the invention there is provided a computer program product comprising transitory or non-transitory computer readable media on which are stored computer instructions which when executed by one or more processor implement the method according to any of the above methods.

According to another aspect of the invention there is provided a computer system for determining a series of control signals for controlling an autonomous vehicle to implement a planned slowdown manoeuvre, the system comprising:
  at least one sensor for detecting an obstacle at a distance ahead of the autonomous vehicle; and
  a controller comprising at least one processor configured to compare the distance with a threshold value and to implement a slowdown manoeuvre in dependence on the comparison, the slowdown manoeuvre selected from:
  a) a first slowdown manoeuvre carried out by a kinematic functions which is a first or higher ordered derivative of acceleration with respect to time in which a constraint optimisation process has been applied relative to the kinematic function, the constraint optimisation process substantially optimising a cost function defined fort the slowdown manoeuvre subject to a set of hard constraints that:
    i. require a final acceleration, speed and position corresponding to the kinematic function to satisfy respectively an acceleration target, a speed target and the position target, given an initial speed and acceleration of the autonomous vehicle, and
    ii. impose a jerk magnitude upper limit on the kinematic function; and
  b) a second slowdown manoeuvre implemented in an adaptive cruise control mode which aims to reach a target headway between the autonomous vehicle and the obstacle.

The system may be implemented in a simulator configured to simulate behaviour of the autonomous vehicle.

The system may also be configured in an autonomous vehicle to control the autonomous vehicle by generating the determined series of control signals to actuators in the autonomous vehicle.

According to yet another aspect of the invention there is provided a method of controlling an autonomous vehicle comprising:
  determining a current headway between the autonomous vehicle and a forward obstacle;
  comparing the current headway with a target headway and selecting a first implementation of automatic cruise control when the current headway exceeds the target headway;
  detecting that the current headway no longer exceeds the target headway and implementing a slowdown manoeuvre using a second implementation of automatic cruise control, wherein the first implementation of automatic cruise control is configured to satisfy constraints of at least one of jerk and acceleration to implement a motion profile satisfying comfort requirements, and wherein the second implementation of automatic cruise control applies constraints for at least one of jerk and acceleration which exceed the parameters set for comfort.

The term obstacle encompasses any type of road object that are expected to be able to move as part of a traffic flow. This may include for example bicycles, horse carriages etc.

BRIEF DESCRIPTION OF DRAWINGS

For a better understanding of the present invention and to show how the same may be carried into effect, reference will now be made by way of example to the accompanying drawings.

DETAILED DESCRIPTION

The present description relates to controlling autonomous vehicles (AV) to perform slowdown manoeuvres. An AV may often be required to stop, particularly in urban settings. It may be required to stop at traffic lights, stop or give way signs or roundabout entrances, for example. Slowdown manoeuvres may be performed in an emergency context, or in non-emergency context. The present disclosure is particularly but not exclusively concerned with emergency contexts, in particular where an obstacle is detected unexpectedly at a distance ahead of the AV. An example of this kind of emergency context is when another vehicle pulls out in front of the ego vehicle, a short distance away from it. In another example, perception factors may have resulted in an obstacle being occluded until it is perceived only a short distance away from the ego vehicle. Such perception factors could be poor weather or poor image sensors.

In each of these emergency scenarios, there is a requirement to bring the AV into a safe condition. This may be a stop condition, or it may be a condition defined relative to the obstacle. It is noted that the techniques described herein may be used in real life AV scenarios or in simulation of real-life scenarios. The planning and manoeuvre selection may be the same in both contexts.

Figure 1:
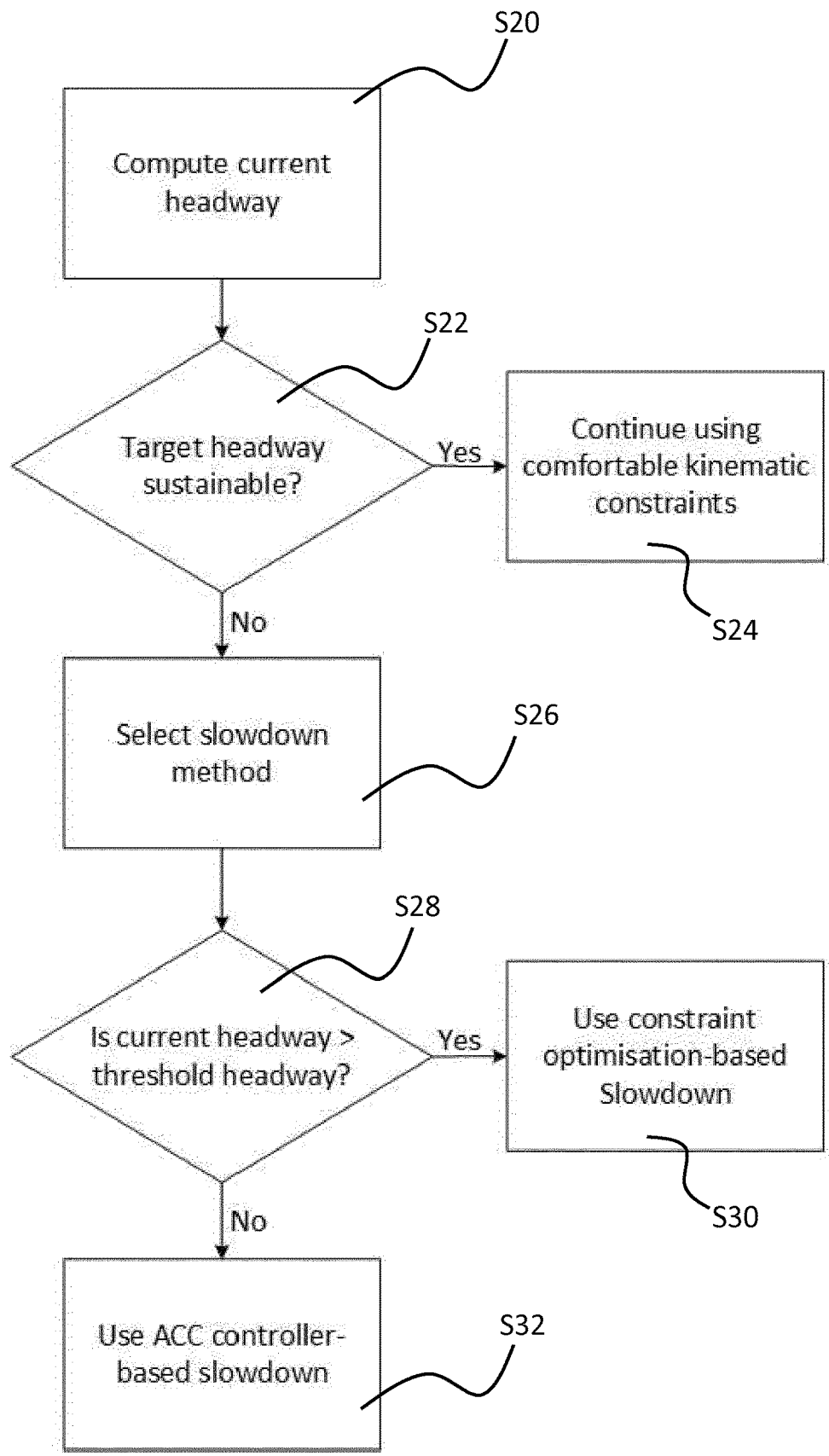
FIG. 1 is a flowchart which represents the process via which an ACC system determines a set of dynamic constraints in which to operate.

FIG. 1 is a flowchart illustrating an exemplary process flow.

In FIG. 1, step S20 denotes the step in which current headway is computed between the ego vehicle and the forward vehicle. Note that this is an ongoing computation while the ego vehicle is driving. For this present example, the assumption is made that the vehicle is operating in automatic cruise control mode while it is driving. In that mode, it is attempting to maintain a target headway between the ego vehicle and the forward vehicle. Step S22 denotes the process of checking whether the current headway exceeds the target headway or not, and therefore whether, based on the current headway, the target headway is sustainable. While the headway is deemed to be sustainable, the ego vehicle continues using comfortable kinematic constraints as denoted at S24.

When the target headway is deemed not to be sustainable, the ego vehicle selects a method of implementing a slowdown manoeuvre, as denoted at step S26. The slowdown manoeuvre is selected based on a comparison of the current headway with the threshold headway. This comparison is shown at S28. If the current headway is greater than the threshold headway, a constraint optimisation slowdown process 122b is utilised, as shown at step S30. If the current headway is less than the threshold headway, slowdown 122c is implemented, for example using a controller-based ACC slowdown, as denoted at step S32.

Figure 4:
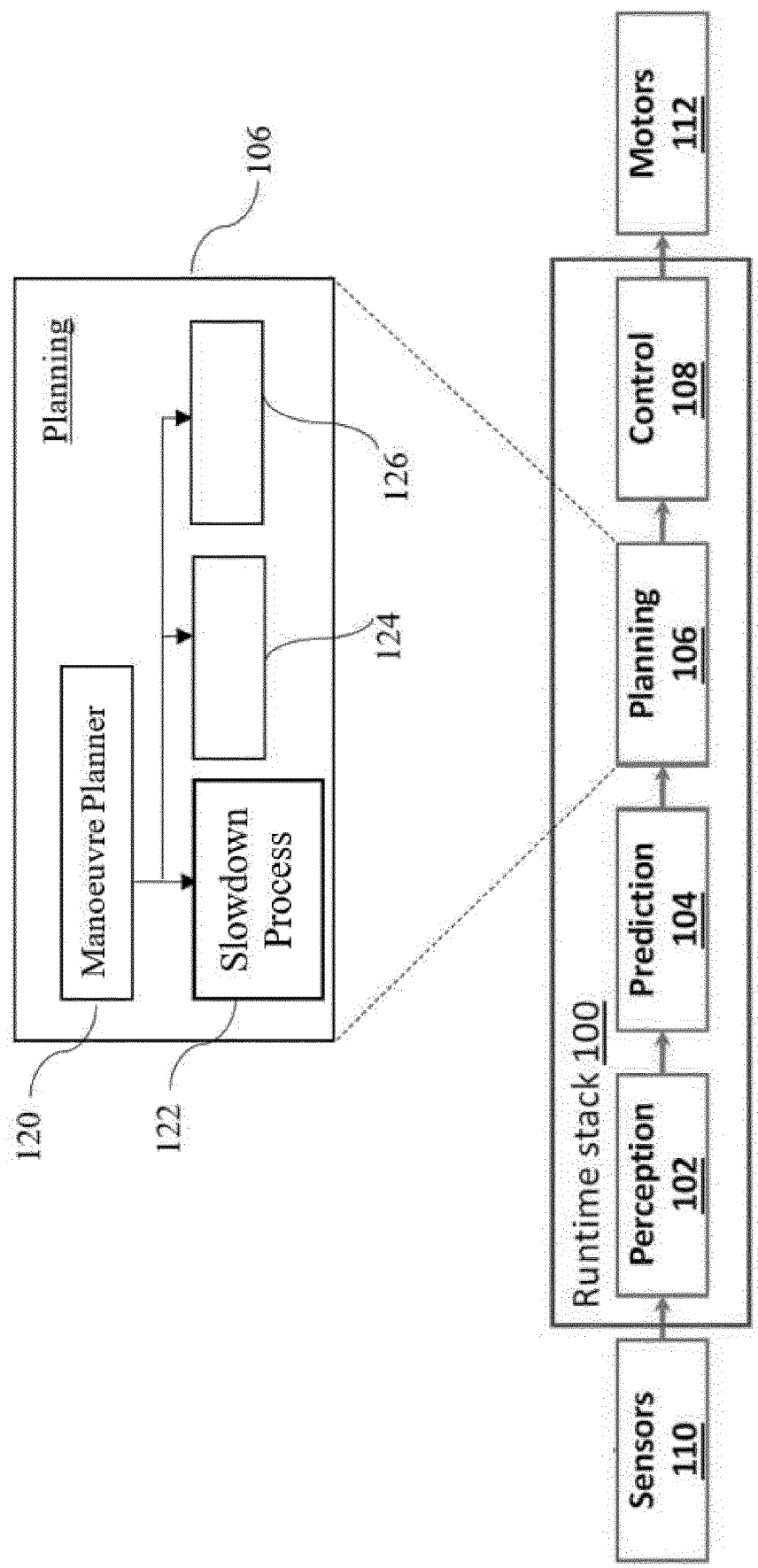
FIG. 4 shows a highly schematic block diagram of a runtime stack for an autonomous vehicle.

FIG. 4 shows a highly schematic block diagram of a runtime stack 100 for an AV. The runtime stack 100 is shown to comprise a perception module 102, a prediction module 104, a planner 106 and a controller 108. The AV may be referred to as the ego vehicle and is denoted by reference numeral 300 in other Figures. The planner 106 has a slowdown process which can implement a slowdown manoeuvre which is one of two types, as described in detail later. The planner 106 may implement additional autonomous planning processes/routines 124, 126 which can be used to carry out other types of manoeuvres.

The examples that immediately follow consider "slowdown" manoeuvres specifically where the aim is to reduce the speed of the AV to some target level. The term "stopping manoeuvre" may be used herein to refer to a slowdown manoeuvre with target speed and acceleration of 0.

A first type of slowdown manoeuvre implements a constraint optimisation process which uses a set of hard constraints. A second type of slowdown manoeuvre is implemented in an adaptive cruise control (ACC) mode in which a target headway is aimed to be maintained between the AV and an obstacle and relative speed is aimed to be minimised. More detail concerning the first and second types, and the parameters that are used to select between them, are given later.

The planner 106 is shown to comprise a manoeuvre planner 120 which plans manoeuvres (high level planning), i.e. determines a manoeuvre to be implemented by the ego vehicle given the current context of the ego vehicle (the planned manoeuvre). Lower level planning decisions for carrying out the planned manoeuvre can then be taken by a suitable one of the "lower level" planning processors 122, 124, 126.

The manoeuvre planner 120 receives inputs which can be used to plan manoeuvres. At this stage, the planning is high level and is used to determine what sort of behaviour or manoeuvre the ego vehicle may have to implement (e.g. stop, follow lane, turn left, overtake etc.) rather than exactly how the manoeuvre is to be carried out. For example, the manoeuvre planner 120 may receive the velocity and acceleration of the ego vehicle 300, the distance between the ego vehicle 300 and a forward vehicle 302 and/or the velocity and acceleration of the forward vehicle 302. These measurements may be received from perception module 102 and may have been detected by the onboard sensors 110. The term "forward vehicle" is used herein to describe a vehicle directly in front of the ego vehicle 300 travelling along substantially the same path and in the same direction as the ego vehicle.

The perception module 102 receives sensor outputs from an onboard sensor system 110 of the AV.

The onboard sensor system 110 can take different forms but generally comprises a variety of sensors such as image capture devices (cameras/optical sensors), LiDAR and/or RADAR units, satellite positioning sensors (GPS etc.), motion sensors (accelerometers, gyroscopes etc.) which collectively provide rich sensor data from which it is possible to extract detailed information about the surrounding environment and the state of the AV and any external actors (vehicles, pedestrians, cyclists etc.) within that environment.

Hence, the sensor outputs typically comprise sensor data of multiple sensor modalities such as stereo images from one or more stereo optical sensors, LIDAR, RADAR etc.

The perception module 102 comprises multiple perception components which cooperate to interpret the sensor outputs and thereby provide perception outputs to the prediction module 104. The perception outputs from the perception module are used by the prediction module 104 to predict future behaviour of external factors, such as other vehicles in the vicinity of the AV. Predictions predicted by the prediction module 104 are provided to the planner 106, which uses the predictions to make autonomous driving decisions to be executed by the AV in a way that takes into account the predicted behaviour of the external actors.

The controller 108 executes the decisions taken by the planner 106 by providing suitable control signals to an onboard actor system 112 of the AV. In particular, the planner 106 plans manoeuvres to be taken by the AV and the controller 108 converts the data into control signals in order to execute those manoeuvres, in converter 130 [FIG. 5].

The actor system 112 may, for example, comprise drive by way of steering motors, and a throttle and brake control system.

Figure 5:
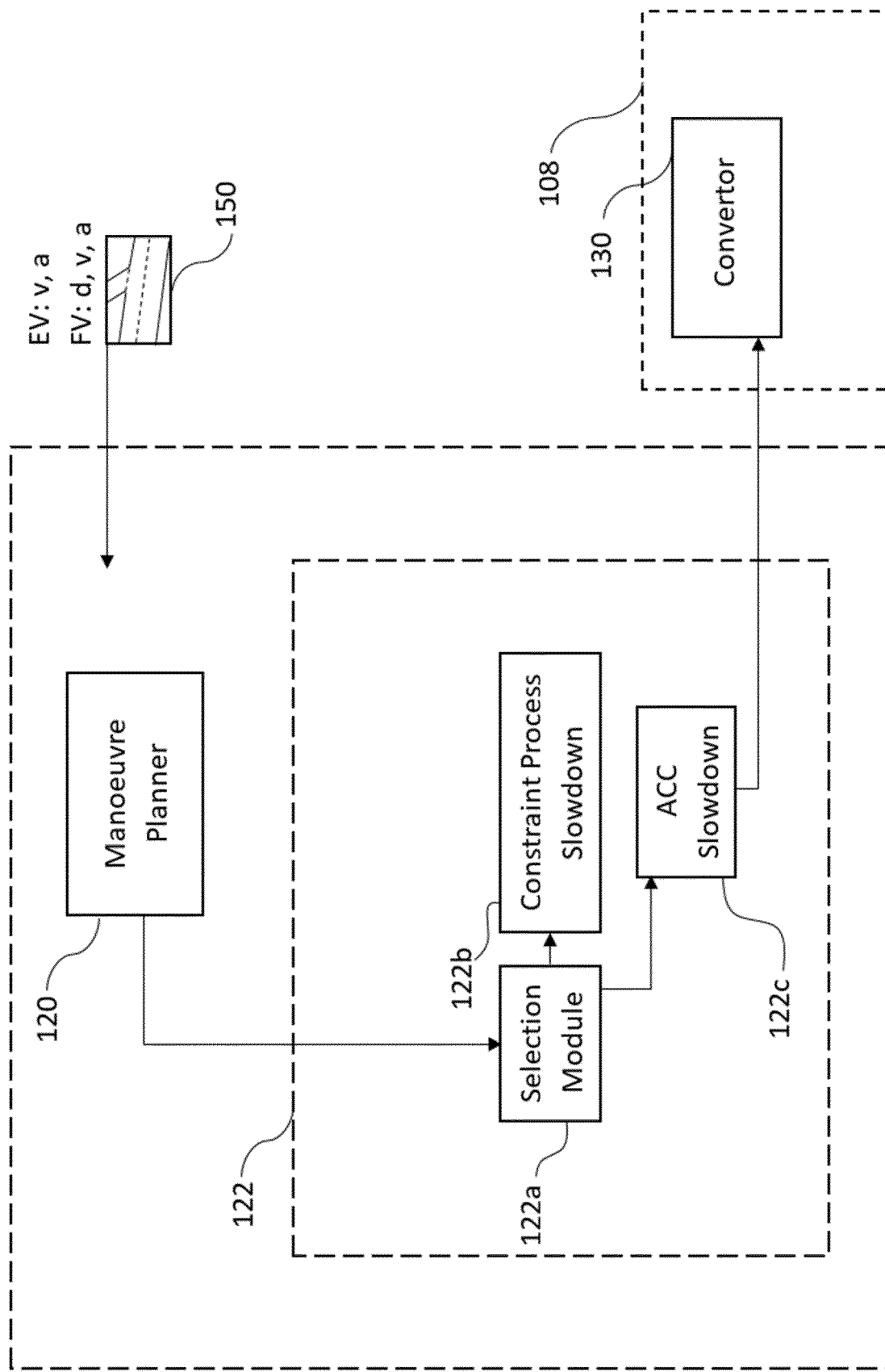
FIG. 5 shows a highly schematic block diagram of the manoeuvre planning and slowdown process in an autonomous vehicle.

FIG. 5 illustrates the manoeuvre planning process and slowdown process 122 in more detail. The slowdown process may select one of two types of slowdown manoeuvre. A first slowdown manoeuvre implements a constraint optimisation process 122b. A second type of slowdown manoeuvre is implemented in an adaptive cruise control mode 122c. Both of these processes and the selection will be described in more detail. The slowdown process 122 comprises a selection module 122a, a first type slowdown process 122b and the second type slowdown process module 122c.

The selection module 122a operates to determine which slowdown manoeuvre to select. The decision is based on "headway" between the ego vehicle and an obstacle that is being detected (unexpectedly) ahead of it. For example, in an urban setting, vehicles pull out in front of other vehicles frequently. This may be the case when switching lanes in order to take a turn off the road on which the vehicles are travelling, or when a vehicle turns onto a road at an intersection. In such a scenario, the "headway" between the ego vehicle and the forward vehicle has now been reduced, since another vehicle has pulled into the space in front of the ego vehicle and the new headway is now measured as the distance to that "cut-in" vehicle.

Headway is generally defined as the distance from the ego vehicle to the forward vehicle. Headway can be defined and measured/estimated as the distance between the front bumper of the ego vehicle and the rear bumper of the forward vehicle, or some other safe rear reference point of the forward vehicle (e.g. to accommodate trailers, rear-mounted bicycles etc.). It would be appreciated that the other more general definition of headway encompasses different possible measured distances. The numerical values given in this disclosure have been found to give good performance with headway defined as the distance from the front bumper to rear bumper, but may be modified to accommodate different definitions of headway. A headway risk of the ego vehicle with respect to the forward vehicle (newly detected obstacle) is categorised, taking into account the present conditions of the ego and forward vehicles and the estimated conditions in a given time period. Once the risk category has been identified, the proper type of slowdown manoeuvre may be selected.

A threshold headway may be set at any suitable value for the context. By way of a non-limiting example it may be set at 8 metres between the ego vehicle and forward vehicle (or other obstacle). When the current headway is greater than this threshold value, but lower than a target headway, a slowdown manoeuvre using a constraint optimisation process is selected. When the headway is below the threshold value, a second type of slowdown manoeuvre is implemented, in a controller-based adaptive cruise control mode.

Firstly, the forward vehicle is identified. The forward vehicle is identified as the vehicle immediately in front of the ego vehicle, which is defined to be following substantially the same spatial path as planned for the ego vehicle, in the same direction.

Once the predicted ego vehicle path has been determined, the movement of the external vehicles within the vicinity of the ego vehicle are assessed. The ego vehicle determines which, if any, of external vehicles are travelling along substantially the same path as the ego vehicle. For example, an external vehicle which is travelling at an angle to the ego vehicle such that the paths of the two vehicles briefly intersect, but the external vehicle does not continue along substantially the same path as the ego vehicle is not a forward vehicle. Nor, for example, is a vehicle travelling towards the ego vehicle in the adjacent lane in the opposite direction. The velocities of the external vehicles may be projected onto the ego vehicle path to determine if they are travelling along the path of the ego vehicle and in the same direction as the ego vehicle. The velocities, and so directions, of the external vehicle may be determined by the perception stack 102. In a lane merging scenario, two vehicle paths may be predicted to merge in the near future, and the merging path may be considered substantially the same path.

An external vehicle which is found to be travelling on the same path as the ego vehicle and is directly in front of the ego vehicle, i.e. there are no other vehicles travelling on the ego vehicle path between the ego vehicle and the external vehicle, is determined to be the forward vehicle. The ego vehicle can then check the current headway against the threshold headway values, as defined by the current velocity of the ego vehicle.

The current headway may be found using one or more sensors of the sensor system 110 positioned on the ego vehicle, such as radar or laser sensors.

It will be appreciated that the sensor system 110 may comprise a single sensor or it may comprise multiple sensors. Multiple sensors may be used so that external vehicles which are not positioned directly in front of the ego vehicle may be monitored. The current headway is compared with the risk headway thresholds to determine whether to use the first or second type of slowdown manoeuvre.

Figure 3A:
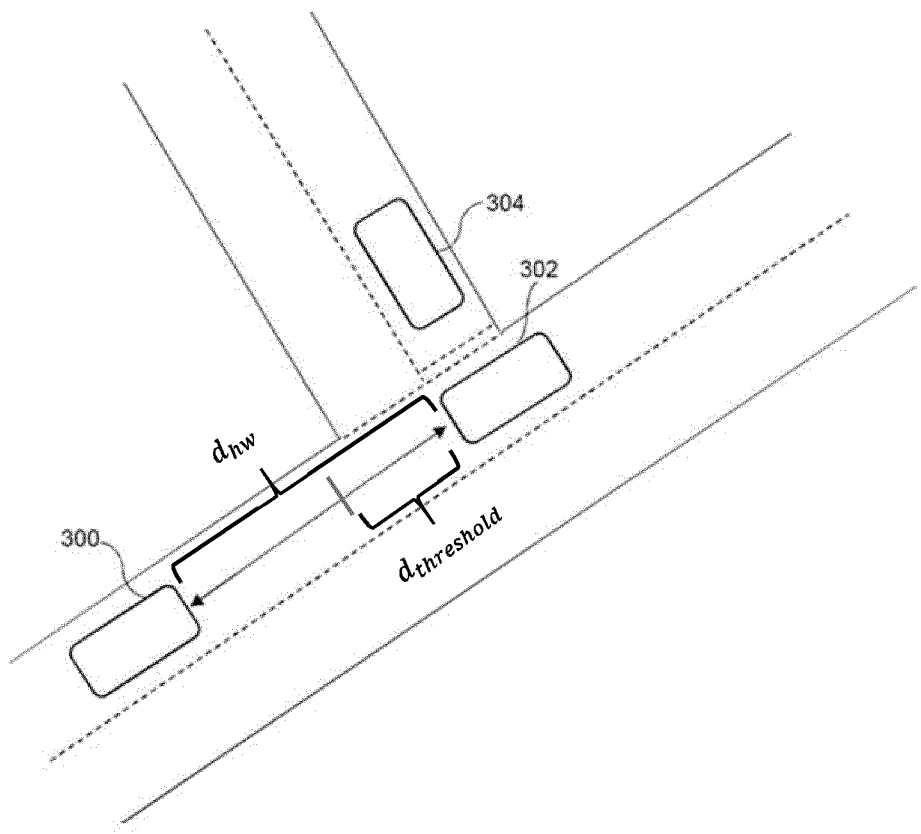
FIG. 3a shows a graphical representation of an exemplary road layout, wherein an ego vehicle is more than a threshold distance from a forward vehicle.
Figure 3B:
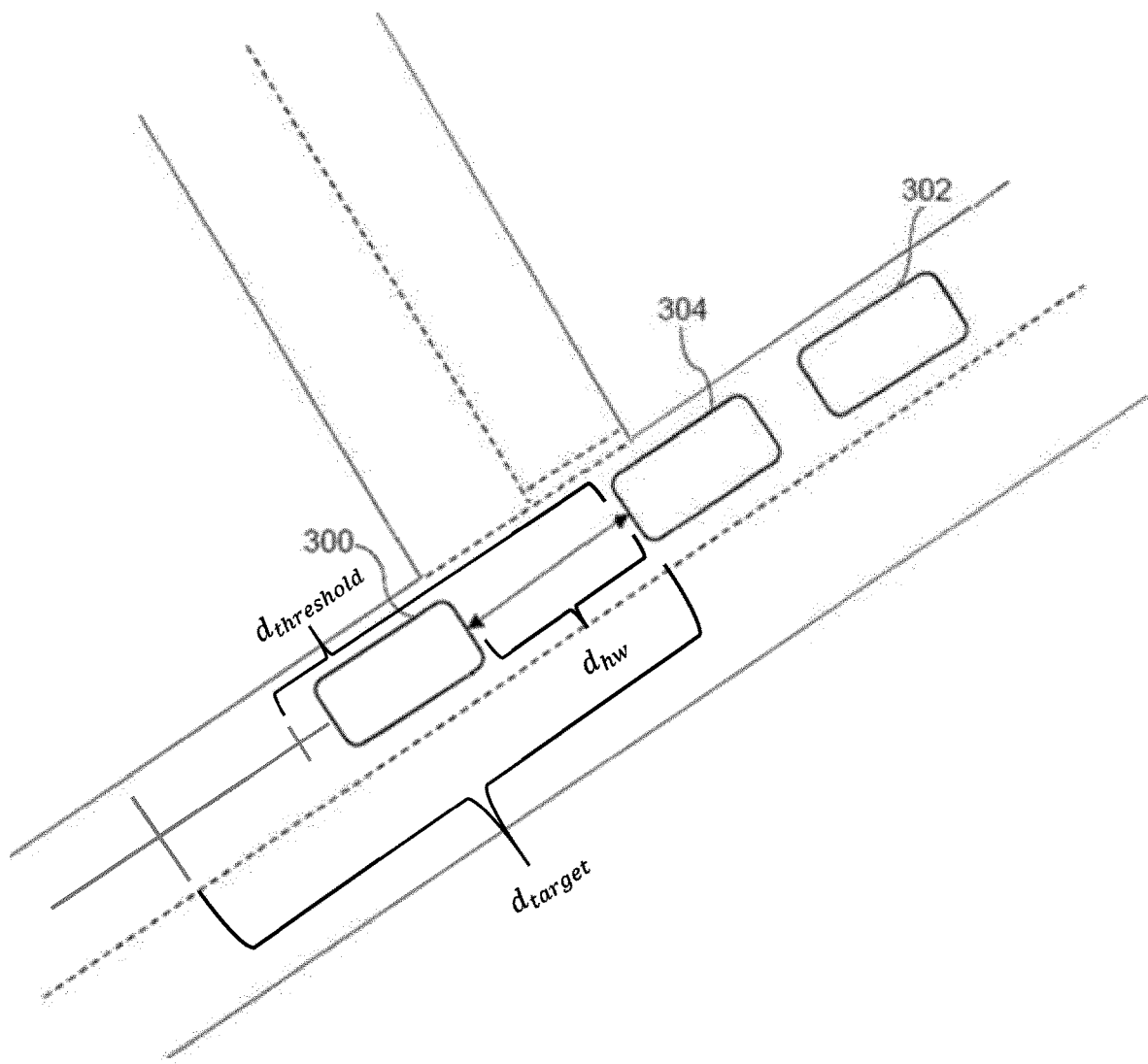
FIG. 3b shows the exemplary road layout of FIG. 3a, wherein a second vehicle has pulled out and become the forward vehicle, and the ego vehicle is less than a threshold distance from the new forward vehicle.
Figure 3C:
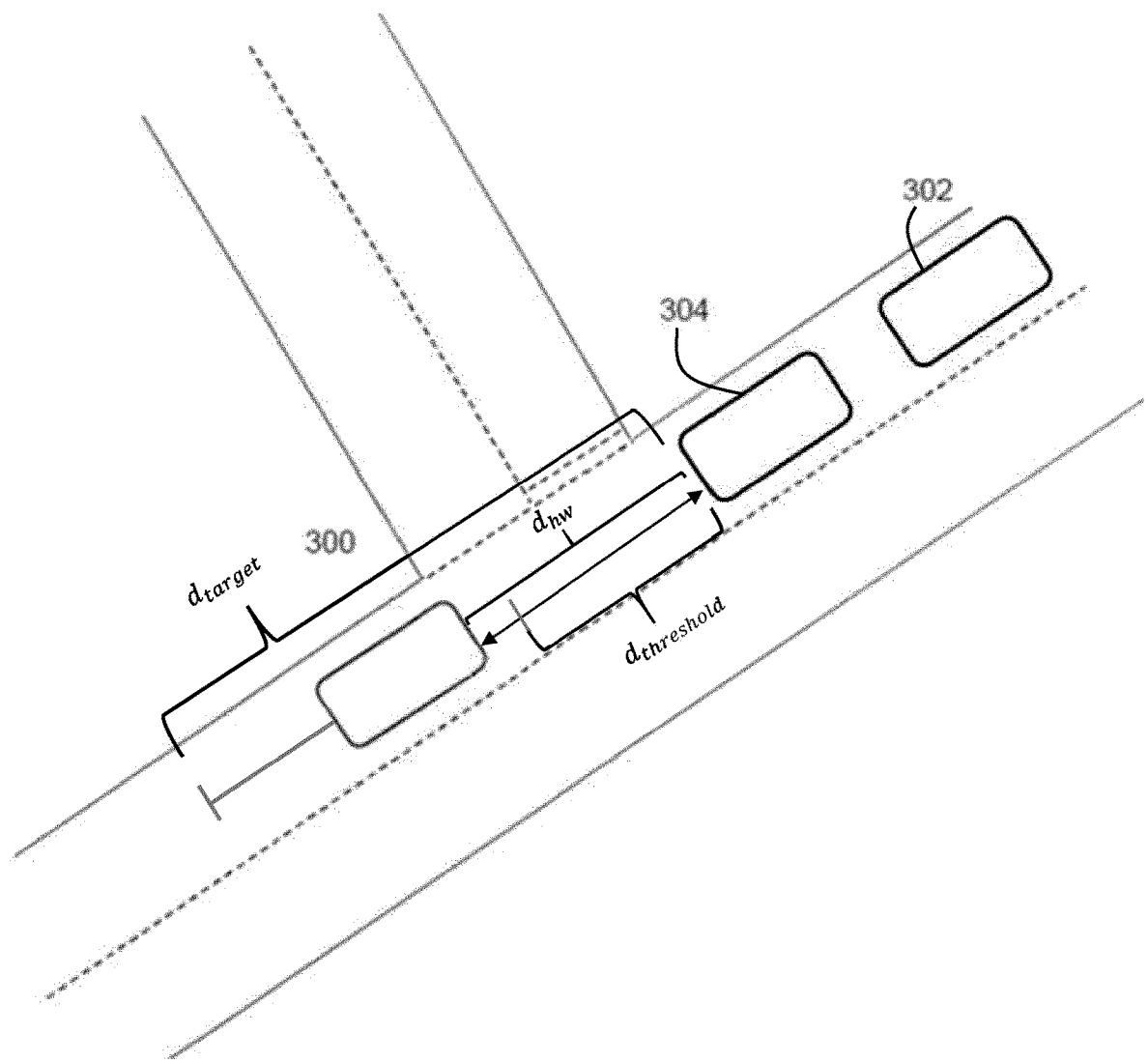
FIG. 3c show the exemplary road layout of FIGS. 3a and 3b, wherein the ego vehicle has maneuvered such that it increases its distance from the forward vehicle to above a threshold distance.

Reference will now be made to FIGS. 3a to 3c to show two different cut-in scenarios.

In FIG. 3a, ego vehicle 300 is following a first external vehicle, forward vehicle 302 along a road at a current headway $d_{hw}$. The current headway is greater than or equal to any threshold headways. Assuming that both the ego vehicle 300 and the forward vehicle 302 are travelling at the speed limit, the current headway does not increase or decrease as the two vehicles 300, 302 travel along the road. The ego vehicle 300 may maintain a target headway from the forward vehicle.

FIG. 3a shows a side road joining the main road. There is a second external vehicle 304 on the side road. FIG. 3b shows the second external vehicle 304 joining the main road in front of the ego vehicle 300 and behind the first external vehicle 302. The ego vehicle 300 now has a current headway which is the distance between itself and the second external vehicle 304, which is now the forward vehicle. In the example of FIG. 3b, the new current headway is less than the threshold headway. Note that the threshold distance $d_{threshold}$ and target headway $d_{target}$ are greater than the current headway of the ego vehicle 300, and therefore are shown behind the ego vehicle 300. In this scenario, the ego vehicle chooses to actively increase its headway by implementing a slowdown manoeuvre of the second type (that is, a controller-based adaptive cruise control mode).

However, in the example of FIG. 3c, the current headway between the ego vehicle 300 and the new forward vehicle 304 is greater than the threshold headway. Therefore, the ego vehicle 300 chooses to increase its headway by using a slowdown manoeuvre of the first type (that is, a constraint optimisation process). Note that the target headway of the ego vehicle remains behind the ego vehicle. In such cases, the ego vehicle will use constraint optimisation slowdown in order to reach the target headway. Note that in the scenario of FIG. 3b, wherein the current headway is less than the threshold headway, the ego vehicle may use a controller-based adaptive cruise control slowdown until it reaches the threshold distance. Upon reaching the threshold distance, the ego vehicle will change to an optimisation approach as it continues to aim to reach a target headway.

Note that in both of the exemplified scenarios, it has been determined that the ego vehicle needs to operate a slowdown manoeuvre. It will readily be appreciated that there are other cut-in scenarios where it is determined that the ego vehicle does not need to implement any slowdown manoeuvre, but may operate some different kind of manoeuvre or deceleration strategy.

Adaptive Cruise Control

The second type of slowdown manoeuvre 122c implemented in adaptive cruise control mode may be implemented using a modification of existing adaptive cruise control techniques. Adaptive cruise control techniques are implemented in semi-autonomous or autonomous vehicles to maintain a safe distance between the vehicle and the vehicle in front, by maintaining a target headway between itself and the forward vehicle. When the current headway dhw of the ego vehicle is above or equal to the target headway, the ego vehicle is deemed to be driving at a safe distance behind the forward vehicle. The ego vehicle aims to travel at the target headway behind the forward vehicle. Recall that in the present case, the current headway would be below that target headway, because the ego vehicle is already in a scenario where it needs to implement a slowdown manoeuvre. In such scenarios, conventional ACC causes the vehicle to decelerate. As explained more fully below, conventional ACC is configured to implement slowdown manoeuvres which satisfy certain constraints, including comfort constraints. By contrast, according to aspects of the present invention, values for certain parameters such as acceleration and jerk may be set at values which may result in an uncomfortable experience for a passenger, but will ensure that the AV is brought to within a safe target headway distance of the forward vehicle. In some more sophisticated systems, the predictive paths of external vehicles are used to anticipate when the ego vehicle will be required to adapt its speed to maintain the target headway.

The ACC mode is capable of autonomously adjusting the speed of the ego vehicle based on the measured speed of the forward vehicle and a measured current headway with the aim of maintain the target headway (i.e. substantially matching the current headway to the target headway, possibly up to a maximum speed threshold).

The target headway may vary in dependence on the speed of the ego vehicle. Thus, when the ego vehicle speeds up, the target headway may increase. ACC attempts to balance matching the speed of the forward vehicle with keeping a certain distance behind the forward vehicle where the distance between the ego vehicle and the forward vehicle is proportional to the speed of the ego vehicle. Together these two factors ensure the ego vehicle moves with the traffic flow while staying at a safe distance behind the forward vehicle.

For example, if the forward vehicle increases its speed, the ACC system may cause the ego vehicle to accelerate to match the speed of the forward vehicle, in a way that accounts for the fact that, as a speed of the ego vehicle increases, the target headway also increases—the aim being to match the speed of the ego vehicle to the new speed of the forward vehicle, while aiming also to reach and maintain a target headway corresponding to that new speed. The speed of the ego vehicle may be capped so that it cannot increase above a certain speed. The cap may be the speed limit of the road or a maximum speed set by a driver (in semi-autonomous vehicles). If the forward vehicle were to slowdown, the ACC system causes the ego vehicle to decelerate, such that the ego vehicle speed matches the new, lower speed of the forward vehicle, as well as maintaining the required headway.

More detail of Adaptive Cruise Control (ACC) techniques is given in the following. As explained above, such techniques may include generating and using a motion profile to determine the behaviour of a vehicle. A motion profile may be defined as a set of dynamic constraints or rules which determine aspects of the motion of a vehicle, such as position, velocity, acceleration etc. A smooth motion profile is required for the motion of the vehicle to be comfortable for human passengers. This involves achieving a target position via a trajectory generated to minimise jerk (The 3rd derivative of position with respect to time, or "change in acceleration"), as jerk is the biggest source of discomfort while travelling. Present adaptive cruise control systems may function by solving equations of motion such that the route taken by the vehicle controlled by that system is optimised for the comfort of passengers in the vehicle.

Consider a vehicle which is described in its initial state by its position, velocity, and acceleration, denoted $p_0$, $v_0$, and $a_0$ respectively. By way of example, the vehicle may perform a three-phase manoeuvre, comprising an acceleration phase of length $\tau_1$, a steady-state phase of length $\tau_2$, and a deceleration phase of length $\tau_3$. By defining a maximum positive (accelerative) jerk $J_1$ and a maximum negative (decelerative) jerk $J_3$, the final position, velocity and acceleration states of the vehicle, denoted $p_3$, $v_3$, and $a_3$ respectively, may be derived through by equations of motion as follows:

$$a_3 = a_0 + J_1\tau_1 + J_3\tau_3$$

$$v_3 = v_0 + a_0(\tau_1 + \tau_2 + \tau_3) + \frac{J_1\tau_1^2}{2} + (J_1\tau_1)(\tau_2 + \tau_3) + \frac{J_3\tau_3^2}{2}.$$

For brevity, the equation for position $P_3$, which comprises a minimum of 8 terms, has been omitted. The purpose of ACC systems, however, is to compute a trajectory for an ego vehicle (EV) based on a predetermined desired final position, velocity, and acceleration. In such circumstances, the above equations must be rearranged such that the problem becomes one of optimisation. Further challenges to calculating an optimised trajectory may also be apparent, such as when other vehicles are present on a road.

When a forward vehicle (FV) is not present, an ACC system may cause the vehicle to continue at a nominal velocity $v_{nom}$, perhaps defined by a speed limit on the road. If a forward vehicle is present, the ACC system may define a target velocity based on a desired distance or time gap $d_{acc}$ between the EV and the FV:

$$d_{acc} = v_{EV} \times T_t + d_s,$$

where $T_t$ and $d_s$ denote a headway time (such as a 2 s time gap) and static headway (such as an 8 m comfort gap or braking distance), both parameters being configurable by the ACC system. The ACC system may then adjust the behaviour of the EV based on a comparison between $d_{acc}$ and a measured headway $d_{hw}$ between the EV and the FV.

One approach is to consider three states of ACC: disengaged, speed control and position control, the states being switched between one another by the ACC system upon satisfaction of particular conditions. By way of example, a disengaged state may be implemented when a forward vehicle is far enough away that lane following at a nominal speed is safe ($d_{hw} > d_{acc}$). Note that further conditions such as $TTC^{-1} \geq \lambda_1$, where T and C are matrices representing the motion of the vehicle and $\lambda_1$ is an eigenvalue, may also need to be satisfied if the disengaged state is to be imposed. Conditions of this type may also be used to recognise instances where a speed control state (matching speed of a FV) or position control state (slowing down to meet desired headway) should be imposed. As explained above, ACC may, however, impose upper and lower bounds on the magnitude of the motion parameters of the ego vehicle. By way of example, a conventional ACC system may impose acceleratory bounds of $[-2, 2]$ $ms^{-2}$, and jerk bounds of $[-0.5, 0.5]$ $ms^{-3}$. The set of bounds that is imposed may be dependent on the ACC state in which the ego vehicle operates. For example, a position control state may allow a more aggressive deceleration than a speed control state.

Techniques for solving the problem of optimising a planned trajectory are also known. The theory of optimal control aims to solve equations of dynamic systems such that a dynamic system is operated with minimum cost. Optimisation of an ACC system whilst retaining minimal cost may consist of solving equations such that jerk is constrained to maintain comfort, but minimal deviation from the target distances and velocities is caused. Such solutions may be achieved through the use of a Linear-Quadratic Regulator (LQR).

The aim of a conventional ACC system is to provide a suitable acceleration input Sa at each time step dt such that the trajectory is optimised for comfort (low jerk) and final state (low cost to desired state). A suitable value for Sa may be found at each time step by modelling an infinite horizon, continuous-time LQR with a cost function given by:

$$J = \int_0^\infty (\rho_1 \Delta d^2 + \rho_2 \Delta v^2 + r\underline{a}^2)dt$$

in a linear dynamic system defined by $$\dot{x} = Ax + B\underline{a},$$

where $\rho_1$ affects the importance of matching distance ($\Delta d = d_{hw}$), $\rho_2$ affects the importance of matching velocity ($\Delta v$), r is an inversely proportional factor for applying the optimal ACC change in speed, dt is the time step of the ACC algorithm, and A and B are constants.

A solution may be achieved by solving the Riccatti equation with $\dot{x}=0$, using matrices defined by:

$$Q = [\rho_1 \ 0 \ 0 \ \rho_2], R = r, P = [P_1 \ P_2 \ P_3 \ P_4], \text{ where}$$

$$P_1 = -dt\rho_1 + \sqrt{(dt\rho_1) + \rho_1\rho_2 + 2\rho_1\sqrt{\rho_1 r}}$$

$$P_2 = P_3 = P_{1dt} - \sqrt{\rho_1 r}$$

$$P_4 = P_1\sqrt{\frac{r}{\rho_1}} + P_2 dt.$$

The solution for a desired change in speed over a time step dt is given by:

$$u = \frac{1}{r}[(P_1 dt - P_2)\Delta d + (P_3 dt - P_4)\Delta v].$$

As noted earlier, upper and lower bounds in acceleration and jerk space may be defined for each state in which the ACC system can operate. Though the "slowdown ACC" state according to embodiments of the invention may conduct a route calculation in the same way as in other ACC states, the slowdown ACC state may impose a more aggressive set of bounds to acceleration and jerk, between which the ego vehicle can operate. For example, a slowdown ACC state may allow acceleratory bounds of [−4,4] ms$^{-2}$ and jerk bounds of [−10,10] ms$^{-3}$. That is, the bounds may be several times, or even an order of magnitude greater than in conventional ACC.

Constraint Optimisation Process

When the "cut-in" headway is above the threshold risk headway, a first type of slowdown 122b manoeuvre may be implemented using a constraint optimisation process. This slowdown manoeuvre process requires a slowdown distance $p_{target}$ (target position), and the slowdown function 122b is used to carry out a slowdown manoeuvre subject to that constraint. The manoeuvre planner 120 may set the slowdown distance $p_{target}$, and may also set a target speed $V_{target}$ and acceleration $0_{target}$ to be reached within the slowdown distance $p_{target}$.

A slowdown distance is a distance along the road to a location at which the ego vehicle 200 reaches the target velocity $v_{target}$ and acceleration $a_{target}$ (distance along the road can be defined relative to any suitable reference location, such as the current location of the ego vehicle or a global reference location on the road). That is, the location at which both the velocity and the acceleration of the ego vehicle are zero. The slowdown distance is set by the manoeuvre planner 120 as the furthest distance along the road at which it is considered safe for the ego vehicle 300 to reach the required speed and acceleration. This may be set conservatively to account for possible deviation in the actual behaviour of the AV from a trajectory planned by slowdown 122.

Distance along the road is a form of one-dimensional position coordinate and the terms distance and position may be used interchangeably herein, and p(t) and d(t) are used interchangeably herein to denote position/distance.

In some situations, the manoeuvre planner 120 will determine the slowdown distance $p_{target}$ and the targets $a_{target}$, $v_{target}$ based on a static road layout 150 and any relevant contextual information (such as speed limits within particular areas). The static road layout 150 may be captured in a map, determined using the perception module 102, or a combination of both. The ego vehicle may be equipped with high definition maps of its region of operation which are developed for the purpose of planning, which in some cases may be merged with sensor measurements in the perception module 102. Typically, this would be a non-emergency slowdown scenario, such as stopping at a set of traffic lights, stop line, junction etc., or another form of non-emergency slowdown manoeuvre, such as slowing down before entering an area with a lower speed limit.

The slowdown distance $p_{target}$ is set as the distance between the current headway and the threshold value.

Where possible, the target speed and acceleration $v_{target}$, $a_{target}$ are set in dependence on a speed $v_{FV}$ and acceleration $a_{FV}$ of a forward vehicle respectively, such as a measured, estimated or predicted speed. For example, a measured speed and velocity of the forward vehicle may be propagated to determine a predicted speed and acceleration using a constant or decaying acceleration model and/or an acceleration model that takes into account past observations. In this case, the targets $v_{target}$, $a_{target}$ could be set to match the predicted forward vehicle speed and acceleration, at some suitable headway from it, which could, for example, be set in dependence on the predicted motion of the forward vehicle (e.g. $d_{max}$ could be set in dependence on the predicted forward vehicle speed $v_{FV}$ to increase the headway at higher speeds). Alternatively, the targets may simply be set to match the current speed and acceleration.

In some such cases, the targets $v_{target}$, $a_{target}$ may be set to zero either because the forward vehicle is measured to have approximately zero velocity or acceleration along the road, or because the speed or acceleration of the forward vehicle cannot be reliably determined (setting the targets to zero in this case makes the potentially conservative assumption that the other vehicle might be stationary or might stop very suddenly).

Slowdown 122 provides a form of trajectory planning, in that it determines kinematic values for carrying out a planned manoeuvre. This will involve computing a distance-time curve d(t) for carrying out the stopping maneuver (as well as speed, acceleration and jerk), i.e. for bringing the ego vehicle 200 to substantially the targets $v_{target}$, $a_{target}$ within the target distance $p_{target}$. However, in the present described example, slowdown 122b does not plan in terms of distance directly, but rather plans in the jerk-time domain (jerk space). Jerk is defined as the rate of change of acceleration:

$$j(t) = \dot{a}(t) = \frac{da}{dt}$$

where $\alpha$ is acceleration and $\dot{a}$ is jerk, also denoted by j herein.

More generally, slowdown 122 plans in "$n^{th}$ order kinematic space", which herein means planning in terms of the kinematic variable defined as the $n^{th}$ order time derivative of acceleration, i.e.

$$k^{(n)}(t) := \frac{d^n}{dt^n} a(t).$$

Under this terminology, jerk space is the $1^{st}$ order kinematic space, with n=1; and "snap", "crackle" and "pop" are second, third and fourth order kinematic spaces respectively (n=2, 3 and 4 respectively) etc.; $k^{(n)}(t)$ is referred to as an $n^{th}$-order kinematic function. In the described examples, this takes the form of a parameterized curve, though the description applies generally to any form of kinematic function defined by a set of function parameter(s).

In brief, slowdown 122 formulates this specific trajectory planning problem as a constrained optimisation of a cost function, $C(\theta)$, defined over set of curve parameters $\theta$ that define an $n^{th}$-order kinematic curve having a constrained form, for which the following notation is used:

The subscript $\theta$ denotes the fact that this curve has a constrained form defined by the curve parameters $\theta$. The aim is to is to set the curve parameters $\theta$ so as to substantially optimise the cost function $C(\theta)$, but subject to various hard constraints. This can be expressed mathematically as finding:

$$\theta^* = C(\theta)$$

where $\theta^*$ (the solution) represents values of the curve parameters $\theta$ that substantially optimise the cost function subject to the hard constraints.

The first described example considers slowdown planning in jerk space, i.e. order n=1. In this case, slowdown 122 formulates the constrained optimisation problem in terms of a jerk-time curve $j_\theta(t)$ having a constrained form.

Figure 2:
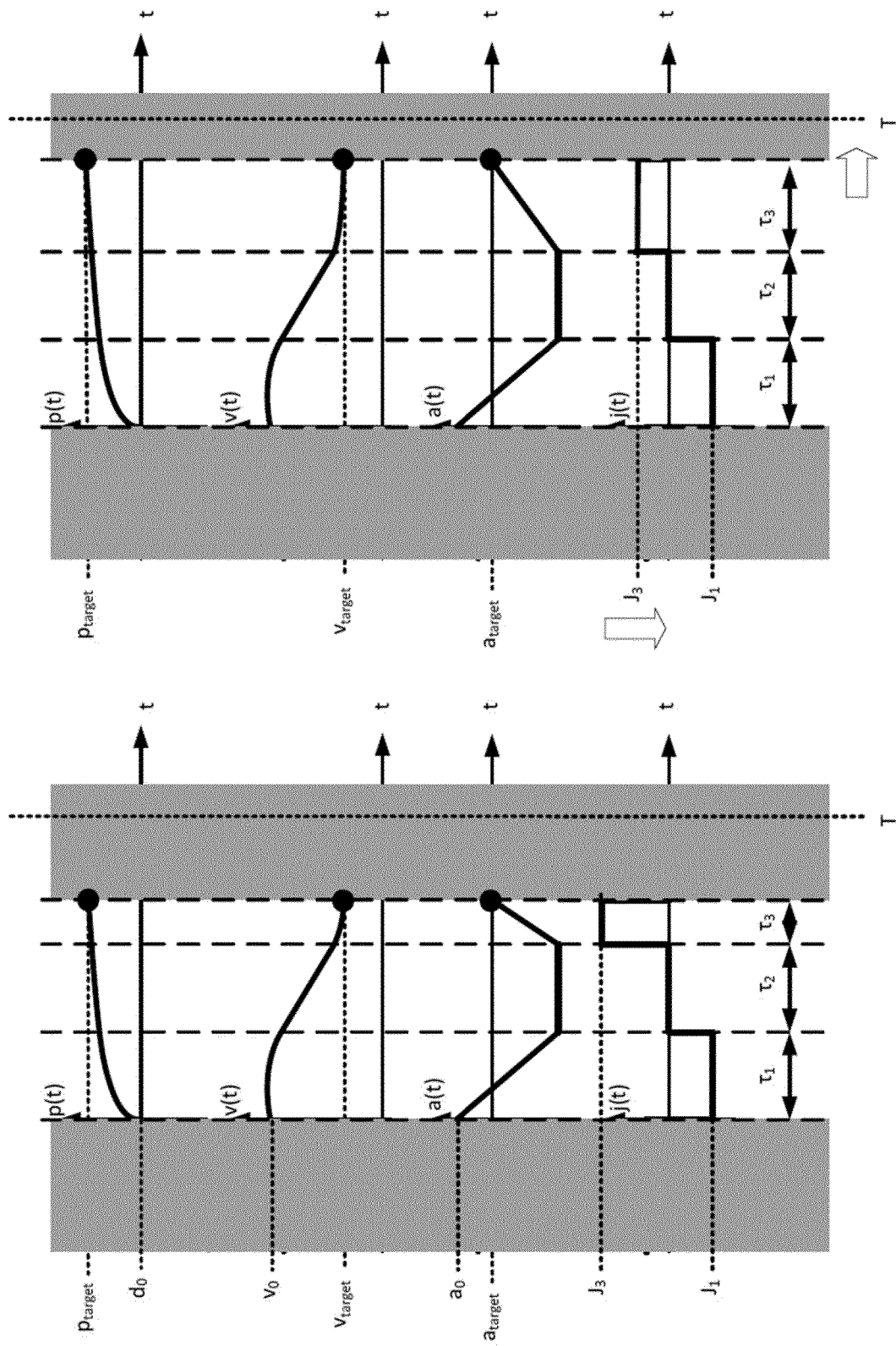
FIG. 2 shows two motion profiles for a vehicle, wherein position, velocity, acceleration and jerk are plotted as a function of time.

FIG. 2 shows the particular form of jerk-time curve $j_\theta(t)$ used in the present example. The jerk-time curve j(t) consists of a first interval of constant negative jerk $J_1$, followed by an second interval of zero-jerk, followed by a third interval of constant positive jerk $J_3$, i.e.

$$j_\theta(t) := k_\theta^{(1)}(t) = \qquad (1)$$
$$\{J_1 \quad 0 \le t \le \tau_1 \quad 0 \quad \tau_1 < t \le \tau_1 + \tau_2 \quad J_3 \quad \tau_1 + \tau_2 < t \le \tau_1 + \tau_2 + \tau_3.$$

Time t=0 is defined as the start of the first interval though this is an arbitrary choice.

In this case, the curve parameters $\theta$ define the jerk-time curve $j_\theta(t)$ and are $\theta = \{\tau_1, \tau_1, \tau_3, J_1, J_3\}$ where $\tau_1, \tau_2$ and $\tau_3$ are the duration of the first, second and third intervals respectively.

With this particular formulation, the constrained optimisation problem may be formulated as:

$$\tau_1^*, \tau_2^*, \tau_3^*, J_1^*, J_3^* = \operatorname*{argmin}_{\tau_1,\tau_2,\tau_3,J_1,J_3} C(\tau_1, \tau_2, \tau_3, J_1, J_3) \qquad (2)$$

s.t. 1: $\tau_1 \ge 0$
2: $\tau_2 \ge 0$
3: $\tau_3 \ge 0$
4: $\tau_1 + \tau_2 + \tau_3 \le T$
5: $-J_{max} \le J_1 \le -J_{min}$
6: $J_{min} \le J_3 \le J_{max}$
7: $a_{min} \le a_0 + J_1\tau_1 \le a_{max}$
8: $a_3 = a_0 + J_1\tau_1 + J_3\tau_3$
9: $v_3 = v_0 + a_0(\tau_1 + \tau_2 + \tau_3) + \frac{J_1}{2}\tau_1^2 +$
$\qquad J_1\tau_1(\tau_2 + \tau_3) + \frac{J_3}{2}\tau_3^2$
10: $p_3 = p_0 + v_0(\tau_1 + \tau_2 + \tau_3) +$
$a_0(\tau_1\tau_2 + \tau_1\tau_3 + \tau_2\tau_3) + J_1\tau_1\tau_2\tau_3 +$
$\frac{J_1}{2}(\tau_1^2\tau_2 + \tau_1^2\tau_3 + \tau_2^2\tau_1 + \tau_1\tau_3^2) +$
$\frac{a_0}{2}(\tau_1^2 + \tau_2^2 + \tau_3^2) + \frac{J_1}{6}\tau_1^3 + \frac{J_3}{6}\tau_3^3$ As will be appreciated, this constrained optimisation problem can be solved using a variety of known techniques. This does not preclude the use of substitution for the equality constraints, e.g. constraint 8 could potentially be used to substitute one of $A_1$, $\tau_1$, $J_3$ and $\tau_3$ with a relatively simple function of the other three; and potentially the other equality constraints could be used as a basis for substitution. Equality constraints can also be accommodated using e.g. Lagrange multiplier techniques. optimisation techniques such as branch and bound, Russian doll search etc. can accommodate the inequality constraints.

One effective way to perform the optimisation is to optimise for each of a set of $\{J_1, J_3\}$ combination (returning $\tau_1, \tau_2, \tau_3$) and then selecting the solution with the best total score (lowest cost). In other words, multiple iterations of the optimisation would be performed, each with fixed values of $J_1, J_3$; in each iteration, an optimal solution (lowest cost) would be found, giving optimal values of $\tau_1, \tau_2, \tau_3$ for every $J_1, J_3$ combination; and finally, the best overall solution would be selected (i.e. with lowest overall cost).

Hard Constraints:

The constraints numbered 1 to 10 in Equation (2) are examples of "hard constraints" which any solution $\theta^*$ must satisfy. The effect of the hard constraints is as follows.

Constraints 8 to 10 force the solution $\theta^*$ to meet the targets set by the manoeuvre planner 120. In the notation used to define these constraints, the left-hand terms are the targets, i.e.

$$a_3 := a_{target}, \quad v_3 := v_{target}, \quad p_3 := p_{target}.$$

The polynomial terms on the right-hand sides are the acceleration, speed and distance at the end of the third interval $\tau_3$ (i.e. at time $t = \tau_1 + \tau_2 + \tau_3$) resulting from the parameters $\theta$ and an initial position $p_0$, speed $v_0$ and acceleration $a_0$ (as derived through successive analytical integration of Equation 1 with respect to time, with $p_0$, $v_0$ and $a_0$ as boundary conditions for t=0—see Annex A). Hence, these constraints encode the requirement that the acceleration, speed and position of the ego vehicle must equal the targets $a_3$, $v_3$, $P_3$ respectively at time $t = t_{end} := \tau_1 + \tau_2 + \tau_3$. That is, the targets $a_3$, $v_3$ and $P_3$ must all be reached simultaneously at time $t_{end}$.

The time $t_{end} = \tau_1 + \tau_2 + \tau_3$ at which the targets much be reached is not specified, beyond the requirement that it does not exceed a maximum time T (hard constraint 4). This ensures the manoeuvre is completed within at or before time t=T.

Hard constraints 5 and 6 require the jerk in the first time interval $J_1$ to be negative and the jerk $J_3$ in the third time interval to be positive, each with a magnitude of at least $J_{min}$ but no greater than $J_{max}$ ($J_{min}$ and $J_{max}$ are both positive).

Figure 2A:
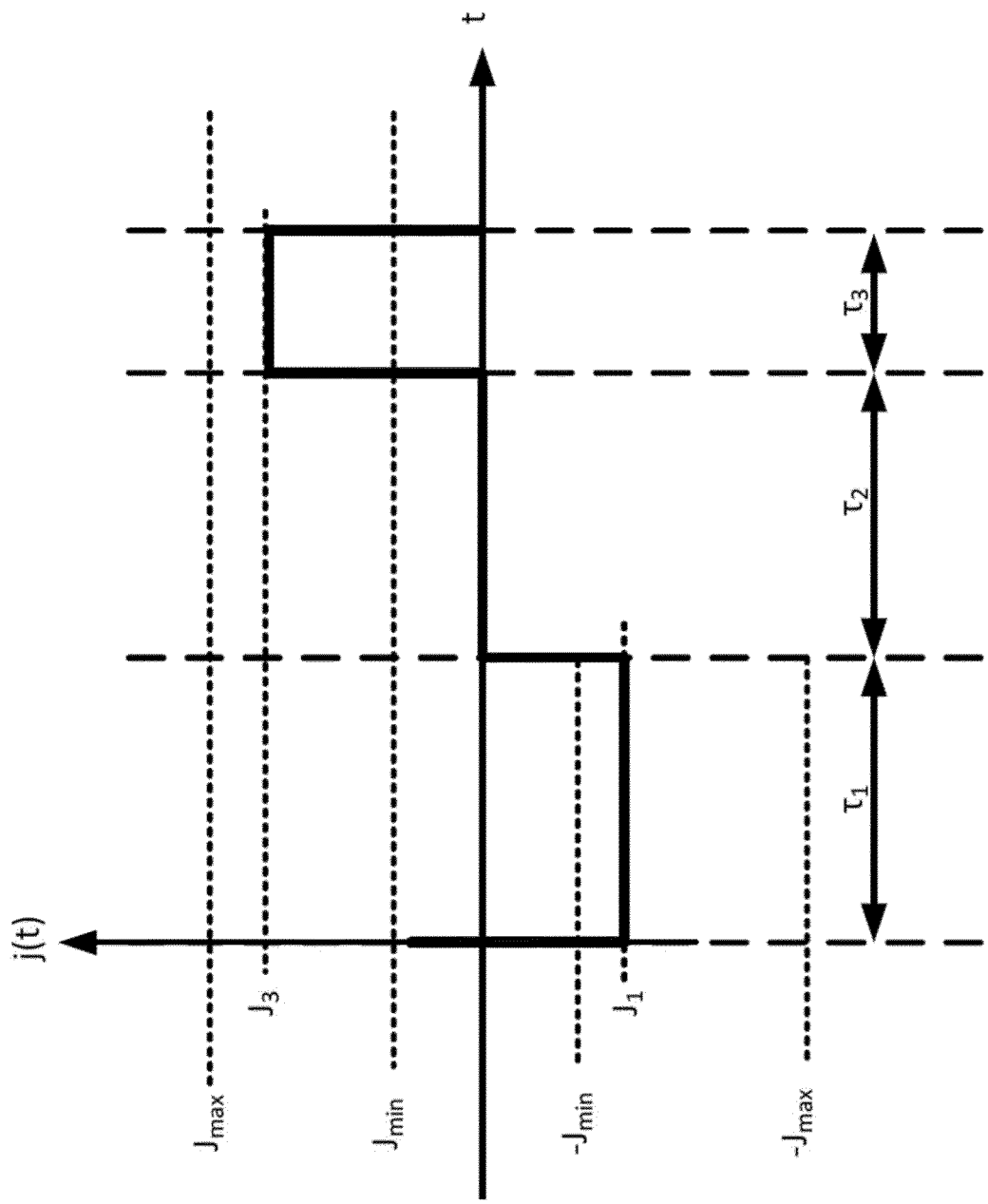
FIG. 2a shows a graph which plots the motion of a vehicle in jerk space as a function of time.

FIG. 2a shows an enlarged version of the jerk-time curve, annotated with the jerk limits.

With regards to hard constraints 5 and 6, jerk is felt by passengers of the ego vehicle 200, and research has been conducted into the relationship between jerk and comfort. Through various tests, the inventors of the present invention have found that excessive jerk magnitude is more likely to cause discomfort than long intervals of lower-magnitude jerk. On that basis, optimisation of comfort is achieved in the present embodiment with explicit constraints on jerk magnitude, but without any explicit constraints on the duration of any interval of sustained non-zero jerk.

Purely by way of example, FIG. 2 shows how $T_3$ might be extended in the search for an optimal solution. In this example, the effect of that increase is offset by a reduction in $J_3$ to ensure the targets are still reached at the end of $\tau_3$. As will be appreciated, this is a highly simplified example to illustrate the basic principles of the constrained optimisation within the targets (also, as noted above, one optimisation method fixes $J_1$ and $J_3$ in a given iteration, and then looks for optimal durations; which is different to what is shown in FIG. 2).

In hard constraint 7, $a_0+J_1\tau_1$ is the acceleration reached at the end of the first time interval and sustained throughout the second interval ($a_0$ being the initial acceleration and $J_1\tau_1$ being the change in acceleration causes by the jerk $J_1$ sustained throughout the first time interval). In the right hand inequality, $a_{max}$ is a negative upper limit on the acceleration, i.e. whatever the value of the initial acceleration $a_0$ (positive, negative or zero), by the end of the first time interval, the acceleration must be negative (i.e. the trajectory must be in a decelerating state) with acceleration magnitude no less than $|a_{max}|$; $a_{min}$ is negative and less than $a_{max}$ (such that $|a_{min}|>|a_{max}|$), and the left hand inequality prevents the magnitude of the acceleration exceeding $|a_{min}|$ (i.e. it imposes a floor on the maximum deceleration). In effect, this imposes an upper of $|a_{min}|$ on the maximum acceleration magnitude: $|a_0+J_1\tau_1|$ is the maximum magnitude the acceleration because of constraint 6, which requires the jerk $J_3$ in the third interval to be positive (see FIGS. 2 and 2a).

Figure 2B:
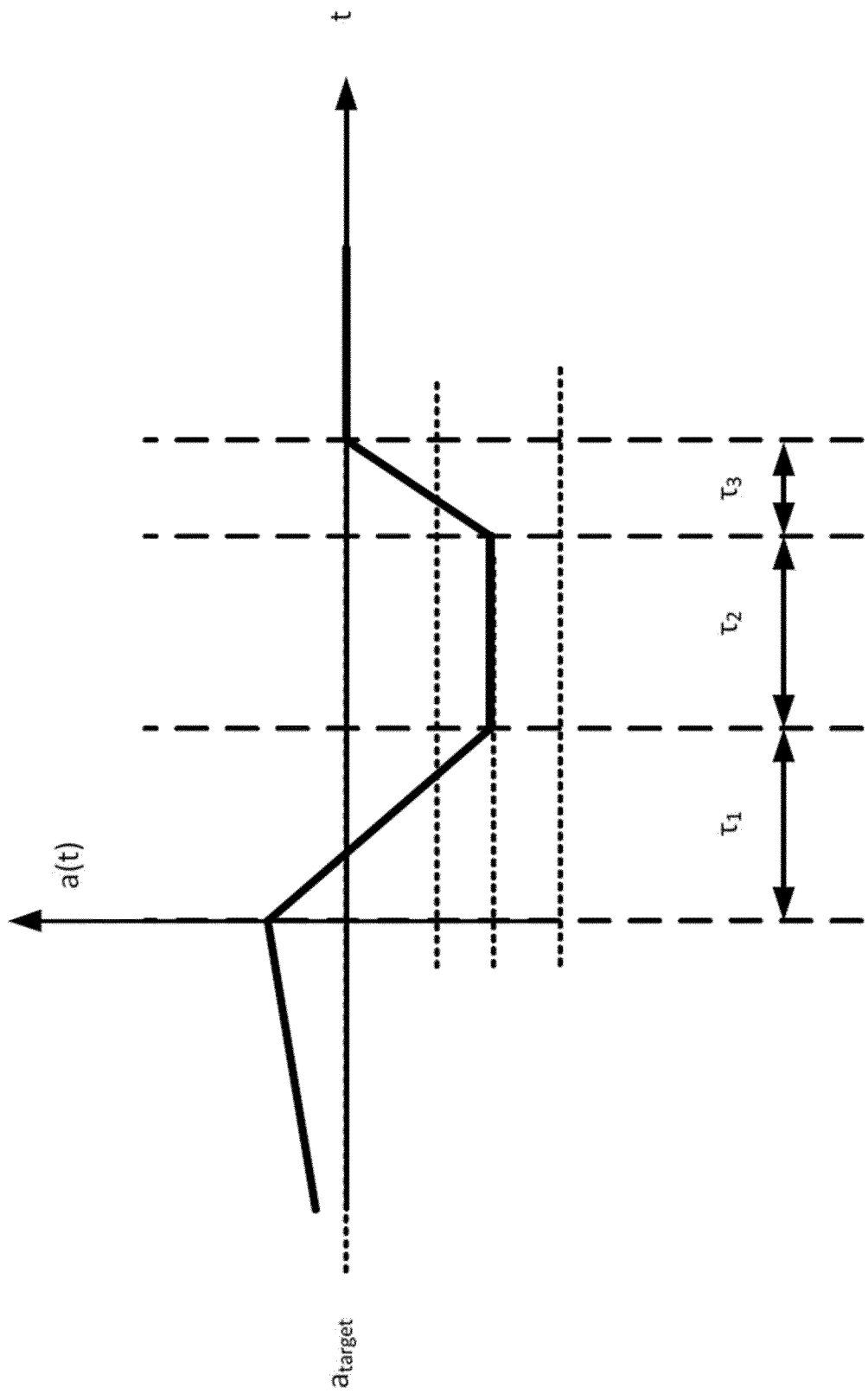
FIG. 2b shows a graph which plots the motion of a vehicle in acceleration space as a function of time

FIG. 2B shows an expanded view of the acceleration-time curve, annotated with the acceleration limits.

Hard constraints 1 to 3 prevent non-physical solutions with time intervals of negative duration.

Constraining the form of the jerk-time curve as in Equation 1 has the effect of reducing the general constrained optimisation problem to the much simpler problem of finding values for the parameters that optimise the cost function, to the extent possible given the other hard constraints. This is described in further detail below, with reference to FIG. 2. Note that, for the purpose of the optimisation, all of the information about the constrained form is encoded by defining the cost function in terms of the curve parameters $\theta$ and by setting the hard constraints appropriately. In particular, hard constraints 8 to 10 fully encode the relationship between jerk, acceleration, speed and position (implicit in Equation 1) in terms of simple closed-form functions. The ability to encode the form of the curve in this manner stems from the fact that the jerk-time curve of Equation (1) can be integrated analytically, i.e. successive integrals with respect to time can be expressed in closed form.

Although not captured in Equation 2, a magnitude limit on speed might also be imposed on speed. For example, if slowdown is starting from a state of positive acceleration, without an explicit limit on speed, the initial jerk of the first interval $\tau_1$ may not be sufficient to prevent the speed increasing above a speed limit or other speed threshold. Therefore, a hard constraint on speed magnitude may be useful.

Cost Function:

With the hard constraints above, a simple but reasonably effective cost function can be used, which only takes into account the time taken to complete the manoeuvre, such as $$C(\tau_1, \tau_2, \tau_3) = w_1\tau_1 + w_2\tau_2 + w_3\tau_3. \quad (3)$$

In Equation 3, $w_1$, $W_2$ and $w_3$ are weights applied to each time interval. With similar values of the weights, the cost function simply penalizes total time taken to complete the manoeuvre (i.e. the cost increases as $\tau_1+\tau_2+\tau_3$ increases; $t_{end}=\tau_1+\tau_2+\tau_3$ being the time at which the targets must be reached, as per hard constraints 8 to 10 in Equation 2). With different values of the weights, an increase in the duration of one-time interval may be penalized more heavily (i.e. cause a greater increase in cost) than an equivalent increase in the duration of another.

Equation 3 can therefore be seen to embody an objective of minimizing the duration of each time interval. The terms "soft constraint" may be used to refer to an objective encoded in the cost function itself.

A second example cost function considered herein encodes additional jerk-minimization objectives:

$$C(\tau_1, \tau_2, \tau_3, J_1, J_3) = \\ w_1\tau_1 + w_2\tau_2 + w_3\tau_3 + w_4(J_1)^2 + w_5(J_3)^2 + w_6(J_1+J_3)^2. \quad (4)$$

The fourth and fifth terms have the effect of penalizing increases in the amount of jerk applied in the first and third time intervals. These are a form of soft comfort constraint, which encourage jerk of lower magnitude (or, more precisely, jerk squared—the cost penalty increases quadratically as the magnitude of the jerk increases).

The sixth term in Equation 4 penalizes differences in the magnitude of jerk applied in the first and third intervals, i.e. it encourages a similar magnitude of jerk to be applied in the first and third time intervals (from hard constraints 5 and 6 in Equation 2, $J_1$ must be negative and $J_3$ must be positive, so term 6 is zero when $J_1$ and $J_3$ have equal magnitude).

The constrained optimisation attempts to set the parameters in a way that minimizes the cost function C (however it is defined), but without violating any of the hard constraints. Hence, the cost function encourages the fulfilment of the objectives (soft constraints) it encodes to the extent that is possible within the hard constraints. In other words, the solution $\theta^*$ with the highest overall score (lowest cost) that also meets all of the hard constraints is selected at the end of the constrained optimisation process.

Suitable values of the weights may be determined through routine experimentation. These may be tuned to mirror "normal" driving behaviour determined through observation of actual human drivers. This could be manual tweaking based on qualitative observations, or machine learning techniques could be used to set the parameters through structured training.

Returning to FIG. 5, the controller 108 is shown to receive the substantially optimal parameters $\theta^*$ and converts them into a series of control signals. The series of control signals specifies the braking required in order to implement the substantially optimal jerk-time series $j_{\theta^*}(t)$, thereby bringing the ego vehicle 200 to a halt without substantially exceeding the slowdown distance $d_{target}$. The series of control signals can be derived from the jerk-time series $j_{\theta^*}(t)$ in any suitable manner, directly or indirectly. For example, it could be that what is actually provided to the controller 108 is a position-time p(t) derived analytically as a third order integral of $j_{\theta^*}(t)$ with respect to time, or any other kinematic information derived from the substantially optimal parameters $\theta^*$.

Constrained Form of Jerk Curve:

The considerations behind the constraint on the form of the jerk-time curve will now be described in further detail.

FIG. 2 shows a series of graphs showing the relationship between displacement, velocity, acceleration, and jerk for a jerk-time curve of the form $j_\theta(t)$. The graphs show the time interval between implementing slowdown, i.e. when the manoeuvre planner 120 selects slowdown 122, at t=0 and the end of the manoeuvre at time $t_{end}=\tau_1+\tau_2+\tau_3$. Prior to t=0, the motion of the ego vehicle is not planned by slowdown 122, but rather by some other trajectory planner of the manoeuvre planner 120 or planning module 106.

Time periods in which motion is planned outside of slowdown are denoted using diagonal shading. Slowdown 122 only plans within the non-shaded interval, the duration of which is not fixed, but is limited to be no more than T (hard constraint 4).

The bottom graph shows the constrained form of jerk curve $j_\theta(t)$ (jerk profile) as defined in Equation 1. The jerk-time curve defined by specific values of the parameters $\theta$ can be considered one of a family of jerk-time curves, which all exhibit this predetermined form.

After t=0, the jerk profile is defined over the three time intervals $\tau_1$, $\tau_2$, and $\tau_3$.

This particular example shows a small amount of constant positive jerk prior to t=0, implying a gradually linearly increasing acceleration and quadratically increasing speed. However, this is merely an example and slowdown can commence from any initial jerk value.

At t=0, there is a step in jerk from whatever value it happened to have just before t=0 to a negative jerk $J_1$. The jerk remains constant during the first time interval.

At time $t=\tau_1$, the end of the first time interval, there is a second step in jerk from $J_1$ to 0 m/s$^3$.

The jerk remains constant at 0 m/s$^3$ during the second time interval.

At time $t=\tau_1+\tau_2$, the end of the second time interval, there is a third step in jerk, the jerk increasing from 0 m/s$^3$ to $J_3$. The jerk is constant at $J_3$ for the third time interval.

At time $t_{end}=\tau_1+\tau_2+\tau_3$ there happens to be a final step down in jerk to 0 m/s$^3$—however, this is merely an example, and in any event is something that would be determined not by slowdown 122 but elsewhere in the planning module 106 (i.e. from whatever trajectory planning component takes over from slowdown 122 after time $t_{end}$).

The simple form of jerk profile shown at the bottom of FIG. 2 means that corresponding acceleration-time, velocity-time and distance-time curves a(t), v(t) and p(t) can be derived analytically as a set of closed form functions in t, which in turn can be used to derive the hard constraints 7 to 10 above. The closed form polynomial equations defining a(t), v(t) and p(t), and their derivation using basic calculus, are provided in Annex A for information. However, these are simply provided to illustrate how hard constraints 7 to 10 in equation 2 have been arrived at—the curve functions themselves are not applied or required by the slowdown optimiser. All the optimiser needs to compute an optimal trajectory is the cost function and the hard constraints. It does not need to actually derive the full acceleration, speed and distance-time curves.

This is one example of a "closed form" representation of a(t), v(t) and d(t). As will be appreciated, deriving those curves in terms of closed-form equation is possible not only with the jerk-time curve of FIG. 2, but also other constrained forms of jerk curve provided the form of the jerk-time curve is relatively simple.

Alternatively, a jerk-time curve could be numerically integrated over time to obtain $a_{0:t_{end}}$, $v_{0:t_{end}}$ and $d_{0:t_{end}}$ (where the subscript notation denotes discrete time samples between t=0 and $t=t_{end}$), which may be appropriate for more complex forms of jerk-time curve in particular. The principles remain the same—the jerk-time curve is still defined by a relatively small number of curve parameters that constrain its form, and the optimisation is performed over those parameters, with the same benefits of efficiency and robustness (where the term robust refers to reliable convergence in this context).

As will be appreciated in view of the teaching presented herein, those benefits can be obtained with different constraints on the form of the jerk-time curve, whilst still preserving the benefits of efficiency and/or robustness. Determining whether or not any given constraint on the form of the jerk curve is sufficient to achieve one or both of those benefits would be a matter of routine experimentation.

An "emergency" or "tight" scenario would be one in which a slowdown manoeuvre has to be implemented immediately, typically in response to some sudden event, such as a vehicle pulling out. There is not necessarily any difference in how these are handled within the planning module 106 in terms of the method applied—it may simply be the case that the manoeuvre planner immediately fails to find a solution with the comfortable constraints, and is therefore caused to implement actual slowdown (with the slowdown constraints) immediately. How close it is able to get to the comfortable constraints will depend on the specifics of the situation if necessary, the optimiser can go all the way up to the slowdown constraints, but is discouraged from doing so to the extent possible by aiming to instigate slowdown 122 sufficiently early whenever possible.

The invention claimed is:

1. A computer implemented method of determining a series of control signals for controlling an autonomous vehicle to implement a planned slowdown manoeuvre, the method comprising:
   detecting an obstacle at a distance ahead of the autonomous vehicle;
   comparing the distance with a threshold value and implementing a slowdown manoeuvre in dependence on the comparing, the slowdown manoeuvre selected from:
   a) a first slowdown manoeuvre carried out by a kinematic function which is a first or higher ordered derivative of acceleration with respect to time in which a constraint optimisation process has been applied relative to the kinematic function, the constraint optimisation process substantially optimising a cost function defined for the slowdown manoeuvre subject to a set of hard constraints that:
      i. require a final acceleration, speed and position corresponding to the kinematic function to satisfy respectively an acceleration target, a speed target and a position target, given an initial speed and acceleration of the autonomous vehicle, and
      ii. impose a jerk magnitude upper limit on the kinematic function; and
   b) a second slowdown manoeuvre implemented in an adaptive cruise control mode to reach a target headway between the autonomous vehicle and the obstacle.

2. The method of claim 1 wherein the first slowdown manoeuvre is selected in a scenario where the distance from the autonomous vehicle to the obstacle exceeds the threshold value.

3. The method of claim 2 comprising supplying as the position target for the first slowdown manoeuvre a difference between the threshold value and the distance between the autonomous vehicle and the obstacle.

4. The method of claim 1 wherein the second slowdown manoeuvre is selected when the distance between the autonomous vehicle and the obstacle is less than the threshold value.

5. The method of claim 4 comprising implementing the second slowdown manoeuvre in adaptive cruise control mode comprising determining a target headway $d_{ACC}$ in accordance with:

$$d_{ACC} = V_{EV} \times T_T + D_S$$

where $T_T$ denotes a headway time, $D_S$ denotes a static headway and $V_{EV}$ is a target velocity of the autonomous vehicle.

6. The method of claim 1 wherein the second slowdown manoeuvre is implemented in an adaptive cruise control mode under imposition of constraints in respect of at least one of acceleration or jerk, wherein the constraints are set at values which exceed values for implementing a motion profile satisfying human comfort constraints.

7. The method of claim 6 wherein the applied jerk constraints are [+10,−10] ms$^{-3}$.

8. The method of claim 6 wherein the applied acceleration constraints are [+4,−4] ms$^{-2}$.

9. The method of claim 1 wherein the constraint optimisation process of the first slowdown manoeuvre is applied in respect of the kinematic function by selecting, from a predetermined family of kinematic functions, a selected kinematic function, wherein the kinematic function is selected in the constraint optimisation process, and wherein the selected kinematic function is used to determine the series of control signals for implementing the first slowdown manoeuvre.

10. The method of claim 1 wherein the constraint optimisation process is applied in respect of the kinematic function by computing a kinematic function for carrying out the first slowdown manoeuvre in the constraint optimisation process where the constraint optimisation process is performed in a domain of the kinematic function, with the final acceleration, speed and position derived from the kinematic function, given an initial speed and acceleration of the autonomous vehicle in order to apply the set of hard constraints.

11. The method of claim 10 wherein the series of control signals for implementing the first slowdown manoeuvre are determined based on the constraint optimisation process.

12. The method of claim 1 wherein the adaptive cruise control mode minimises the relative speed between the autonomous vehicle and the obstacle.

13. A computer system for determining a series of control signals for controlling an autonomous vehicle to implement a planned slowdown manoeuvre, the system comprising:
at least one sensor for detecting an obstacle at a distance ahead of the autonomous vehicle; and
a controller comprising at least one processor configured to compare the distance with a threshold value and to implement a slowdown manoeuvre in dependence on the comparison, the slowdown manoeuvre selected from:
a) a first slowdown manoeuvre carried out by a kinematic functions which is a first or higher order derivative of acceleration with respect to time in which a constraint optimisation process has been applied relative to the kinematic function, the constraint optimisation process substantially optimising a cost function defined for the slowdown manoeuvre subject to a set of hard constraints that:
  i. require a final acceleration, speed and position corresponding to the kinematic function to satisfy respectively an acceleration target, a speed target and a position target, given an initial speed and acceleration of the autonomous vehicle, and
  ii. impose a jerk magnitude upper limit on the kinematic function; and
b) a second slowdown manoeuvre implemented in an adaptive cruise control mode to reach a target headway between the autonomous vehicle and the obstacle.

14. A system according to claim 13 implemented in a simulator configured to simulate behaviour of the autonomous vehicle.

15. The system of claim 13 configured in an autonomous vehicle to control the autonomous vehicle by generating the determined series of control signals to actuators in the autonomous vehicle.

16. At least one non-transitory computer readable media on which are stored computer instructions which when executed by one or more processors implement a method comprising:
detecting an obstacle at a distance ahead of an autonomous vehicle;
comparing the distance with a threshold value and implementing a slowdown manoeuvre in dependence on the comparison, the slowdown manoeuvre selected from:
a) a first slowdown manoeuvre carried out by a kinematic function which is a first or higher ordered derivative of acceleration with respect to time in which a constraint optimisation process has been applied relative to the kinematic function, the constraint optimisation process substantially optimising a cost function defined for the slowdown manoeuvre subject to a set of hard constraints that:
  i. require a final acceleration, speed and position corresponding to the kinematic function to satisfy respectively an acceleration target, a speed target and a position target, given an initial speed and acceleration of the autonomous vehicle, and
  ii. impose a jerk magnitude upper limit on the kinematic function; and
b) a second slowdown manoeuvre implemented in an adaptive cruise control mode to reach a target headway between the autonomous vehicle and the obstacle.

* * * * *